(12) United States Patent
Kirkpatrick et al.

(10) Patent No.: US 11,053,168 B2
(45) Date of Patent: Jul. 6, 2021

(54) SYSTEMS AND METHODS FOR CARBON STRUCTURES INCORPORATING SILICON CARBIDE

(71) Applicant: GOODRICH CORPORATION, Charlotte, NC (US)

(72) Inventors: Christopher T. Kirkpatrick, Pueblo West, CO (US); James Warren Rudolph, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 490 days.

(21) Appl. No.: 15/926,632

(22) Filed: Mar. 20, 2018

(65) Prior Publication Data

US 2019/0292107 A1 Sep. 26, 2019

(51) Int. Cl.
*C04B 35/83* (2006.01)
*C04B 35/524* (2006.01)
(Continued)

(52) U.S. Cl.
CPC ............ *C04B 35/83* (2013.01); *C01B 32/168* (2017.08); *C01B 32/194* (2017.08); *C01B 32/956* (2017.08); *C04B 35/524* (2013.01); *C04B 35/571* (2013.01); *C04B 35/573* (2013.01); *C04B 35/62873* (2013.01); *C04B 35/62889* (2013.01); *C04B 35/806* (2013.01); *F16D 69/023* (2013.01); *C01B 2204/20* (2013.01); *C04B 2235/425* (2013.01); *C04B 2235/428* (2013.01); *C04B 2235/46* (2013.01); *C04B 2235/5248* (2013.01);
(Continued)

(58) Field of Classification Search
CPC .............. C04B 35/83; C04B 35/62889; C04B 2235/46; F16D 65/126; F16D 65/127
See application file for complete search history.

(56) References Cited

U.S. PATENT DOCUMENTS 4,294,788 A 10/1981 Laskow et al.
6,221,475 B1 * 4/2001 Domergue ............ C04B 35/806
428/292.1
(Continued)

FOREIGN PATENT DOCUMENTS

CN 106966751 7/2017
EP 0300756 1/1989

OTHER PUBLICATIONS

Xu Yet al: "Carbon/silicon carbide composites prepared by chemical vapor infiltration combined with silicon melt infiltration", Carbon, Elsevier, Oxford, GB, vol. 37, No. 8, Jan. 1, 1999 (Jan. 1, 1999), pp. 1179-1187.
(Continued)

*Primary Examiner* — Michael M. Robinson
(74) *Attorney, Agent, or Firm* — Snell & Wilmer L.L.P.

(57) ABSTRACT

A method of treating a carbon/carbon composite is provided. The method may include infiltrating a carbonized fibrous structure with hydrocarbon gas to form a densified fibrous structure. The method may include treating the densified fibrous structure with heat at a first temperature range from about 1600 to about 2400° C. to form a heat treated densified fibrous structure. The method may include infiltrating the heat treated densified fibrous structure with silicon to form a silicon carbide infiltrated fibrous structure.

15 Claims, 3 Drawing Sheets

(51) Int. Cl.
*F16D 65/12* (2006.01)
*C01B 32/168* (2017.01)
*C01B 32/194* (2017.01)
*C01B 32/956* (2017.01)
*F16D 69/02* (2006.01)
*C04B 35/628* (2006.01)
*C04B 35/573* (2006.01)
*C04B 35/571* (2006.01)
*C04B 35/80* (2006.01)
*F16D 69/00* (2006.01)

(52) U.S. Cl.
CPC ............... *C04B 2235/5252* (2013.01); *C04B 2235/5288* (2013.01); *C04B 2235/5292* (2013.01); *C04B 2235/614* (2013.01); *C04B 2235/616* (2013.01); *C04B 2235/661* (2013.01); *C04B 2235/77* (2013.01); *C04B 2235/80* (2013.01); *F16D 65/126* (2013.01); *F16D 65/127* (2013.01); *F16D 2069/003* (2013.01); *F16D 2200/0047* (2013.01)

(56) References Cited

U.S. PATENT DOCUMENTS

| | | | |
|---|---|---|---|
| 6,248,269 | B1 | 6/2001 | Dietrich et al. |
| 6,555,173 | B1 | 4/2003 | Forsythe et al. |
| 7,566,410 | B2 | 7/2009 | Song et al. |
| 9,689,446 | B2 | 6/2017 | Cho et al. |
| 2010/0209659 | A1 | 8/2010 | Boskovic |
| 2011/0124253 | A1* | 5/2011 | Shah ............... C04B 35/83 442/60 |
| 2014/0227511 | A1* | 8/2014 | Mazany ............ C04B 41/52 428/323 |
| 2015/0330464 | A1 | 11/2015 | Kang |
| 2016/0153137 | A9 | 6/2016 | Filip et al. |
| 2016/0319894 | A1 | 11/2016 | Lu et al. |
| 2017/0369713 | A1 | 12/2017 | Poteet |

OTHER PUBLICATIONS

European Patent Office, European Search Report dated Jun. 20, 2019 in Application No. 19163879.0.

* cited by examiner

SYSTEMS AND METHODS FOR CARBON STRUCTURES INCORPORATING SILICON CARBIDE

FIELD

The present disclosure relates to carbon composites, and, more specifically, to a method of forming carbon composites.

BACKGROUND

Various carbon/carbon (C/C) composite structures are used in the aerospace industry for aircraft brake system materials, among other applications. Brake system rotor friction disks and stator friction disks comprising carbon fiber composite materials may exhibit varying wear characteristics resulting in part from the materials used in construction and heat treatments applied. Brake components with poor wear characteristics may have relatively short product lives.

SUMMARY

According to various embodiments, a method of treating a carbon/carbon composite is described herein. The method may include infiltrating a carbonized fibrous structure with hydrocarbon gas to form a densified fibrous structure. The method may include treating a densified fibrous structure with heat at a first temperature range from about 1600 to about 2400° C. to form a heat treated densified fibrous structure. The method may include infiltrating the heat treated densified fibrous structure with silicon to form a silicon carbide infiltrated fibrous structure. According to various embodiments, the method may include depositing at least one of graphene platelets or carbon nanotubes into the densified carbon/carbon composite via a dispersion, through a vacuum impregnation process. According to various embodiments, the method may include machining the heat treated densified fibrous structure to near net-shape. According to various embodiments, the method may include applying an oxidation protection system coating to the silicon carbide infiltrated fibrous structure. According to various embodiments, the infiltrating the heat treated densified fibrous structure with the silicon may occur by at least one of pre-ceramic polymer infiltration or silicon melt infiltration. According to various embodiments, the infiltrating the heat treated densified fibrous structure with the silicon may be performed at a second temperature ranging from about 1400 to about 1600° C. According to various embodiments, the silicon carbide infiltrated fibrous structure has a bulk density of between about 2.0 and about 2.5 g/cc. According to various embodiments, the silicon carbide infiltrated fibrous structure may comprise from about 2% to about 10% silicon carbide ceramic matrix composite by weight. According to various embodiments, the silicon carbide infiltrated fibrous structure has less than about 3% open porosity.

According to various embodiments, a method of treating a carbon structure is described herein. The method may include treating a fibrous structure with heat at a first temperature ranging from about 1400 to about 2800° C. to form a carbonized fibrous structure. The method may include depositing at least one of graphene platelets or carbon nanotubes into the carbonized fibrous structure via a dispersion, through a vacuum impregnation process. The method may include infiltrating the carbonized fibrous structure with hydrocarbon gas to form a densified fibrous structure. The method may include treating the densified fibrous structure with heat at a second temperature range from about 1600 to about 2400° C. to form a heat treated densified fibrous structure. The method may include infiltrating the heat treated densified fibrous structure with silicon to form a silicon carbide infiltrated fibrous structure. According to various embodiments, the method may include machining the heat treated densified fibrous structure to near net-shape. According to various embodiments, the method may include applying an oxidation protection system coating to the silicon carbide infiltrated fibrous structure. According to various embodiments, the treating with heat at the first temperature and the second temperature may be performed under the vacuum. According to various embodiments, the infiltrating the heat treated densified fibrous structure with the silicon may occur by at least one of pre-ceramic polymer infiltration or silicon melt infiltration. According to various embodiments, the infiltrating the heat treated densified fibrous structure with the silicon may be performed at a third temperature ranging from about 1400° C. to about 1600° C. According to various embodiments, the silicon carbide infiltrated fibrous structure may have a bulk density of about 2.0 to about 2.5 g/cc According to various embodiments, the silicon carbide infiltrated fibrous structure may be about 2% to about 10% silicon carbide ceramic matrix composite by weight. According to various embodiments, the silicon carbide infiltrated fibrous structure has less than about 3% open porosity.

According to various embodiments, a carbon/carbon silicon carbide composite structure is described herein. The carbon/carbon silicon carbide composite structure may include a plurality of heat-treated carbon fibers. The heat treated carbon fibers include pyrolytic carbon depositions on the carbon fibers. The carbon/carbon silicon carbide composite structure may include an exterior surface having voids. According to various embodiments, the voids may include silicon carbide bonded to the carbon fibers. According to various embodiments, the carbon/carbon silicon carbide composite structure may be about 2% to about 10% silicon carbide by weight. According to various embodiments, the carbon/carbon silicon carbide composite structure may have a bulk density of about 2.0 to about 2.5 g/cc. According to various embodiments, the carbon/carbon silicon carbide composite structure may be at least one of a stator core or a rotor core.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

All ranges and ratio limits disclosed herein may include their upper and lower limits and may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration, and not of limitation. While these exemplary embodiments are described in sufficient detail to enable those skilled in the art to practice the exemplary embodiments disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented or the exemplary process in which the steps appear in this disclosure. That is, steps recited in any of the method or process descriptions may be applied to and/or removed from any of the exemplary methods or processes described herein. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
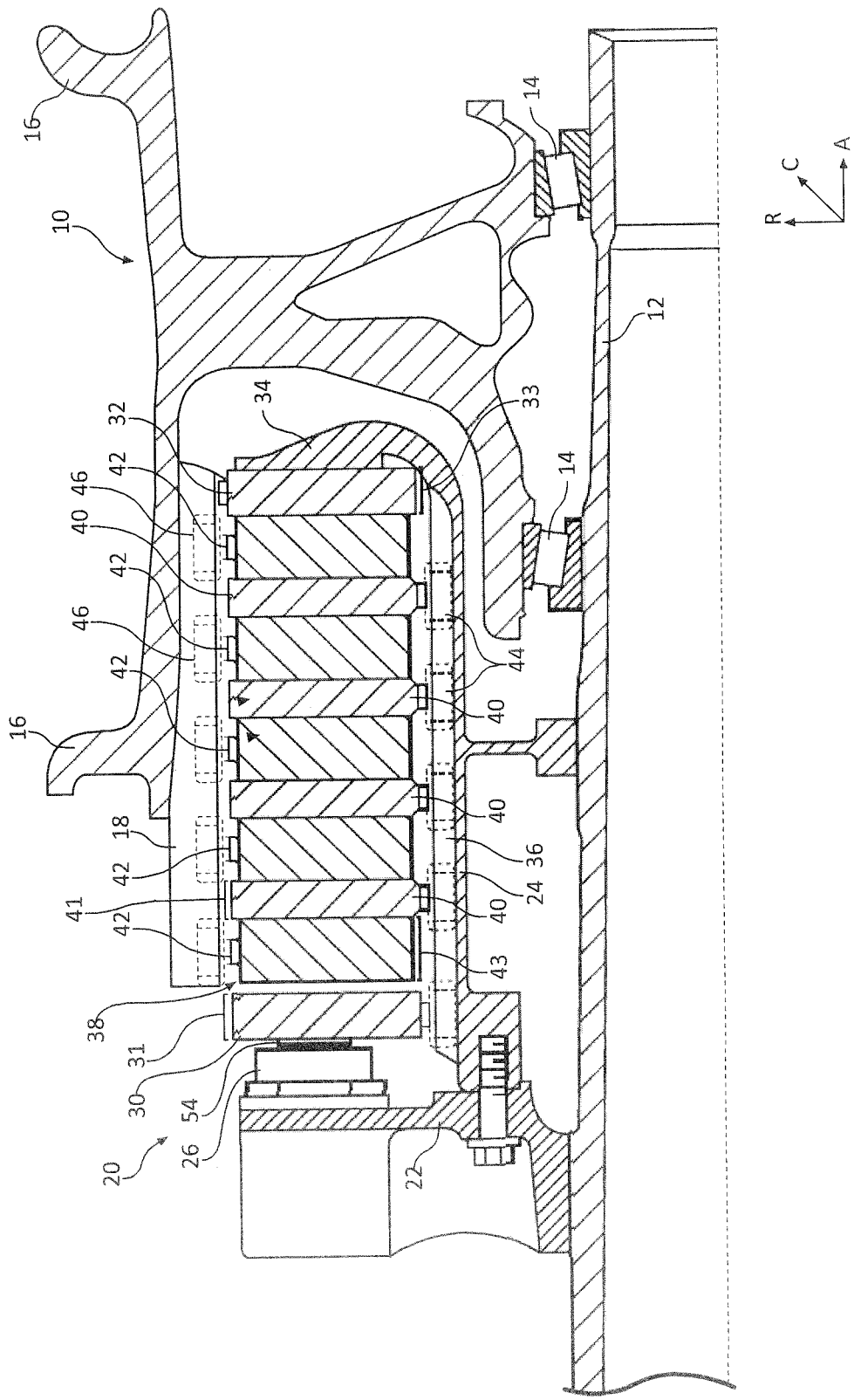
FIG. 1 illustrates a disk brake system, in accordance with various embodiments.

With reference to FIG. 1, a disk brake system 20 is illustrated. In various embodiments, the disk brake system 20 may be used to reduce the speed of a wheel of an aircraft. An A-R-C axis has been included in the drawings to illustrate the axial (A), radial (R) and circumferential (C) directions. The system may include a wheel 10 supported for rotation around an axle 12 by bearings 14. The wheel 10 includes rims 16 for supporting a tire, and a series of axially extending rotor splines 18 (one shown). Rotation of the wheel 10 is modulated by the disk brake system 20. The disk brake system 20 includes a torque flange 22, a torque tube 24, a plurality of pistons 26 (one shown), a pressure plate 30, and an end plate 32. Pressure plate 30 comprises a pressure plate thickness 31, and end plate 32 comprises an end plate thickness 33. In various embodiments, the pressure plate 30 and the end plate 32 are annular disks. The torque tube 24 is an elongated annular structure that includes a reaction plate 34 and a series of axially extending stator splines 36 (one shown). The reaction plate 34 and stator splines 36 may be integral with the torque tube 24 as shown in FIG. 1, or attached as separate components.

In accordance with various embodiments, the disk brake system 20 also includes a plurality of friction disks 38. The plurality of friction disks 38 includes at least one non-rotatable friction disk, also known as a stator friction disk 40 comprising a stator thickness 41, and at least one rotatable friction disk, also known as a rotor friction disk 42 comprising a rotor thickness 43. The stator friction disk 40 and rotor friction disk 42 may be located adjacent to one another in the disk brake system 20, forming a plurality of adjacent stator-rotor pairs. While not illustrated for ease of illustration, the at least one stator friction disk 40 may further comprise a stator core with a floating stator wear liner on one or both sides thereof. The at least one rotor may further comprise a rotor core with a floating rotor wear liner on one or both sides thereof. Each of the plurality of friction disks 38 includes an attachment structure. As shown in FIG. 1, each of four stator friction disks 40 include a plurality of stator lugs 44 at circumferentially spaced positions around the stator friction disk 40 as an attachment structure. Similarly, each of five rotor friction disks 42 include a plurality of rotor lugs 46 at circumferentially spaced positions around the rotor friction disk 42 as an attachment structure. In various embodiments, and as shown in FIG. 1, the pressure plate 30, end plate 32, and friction disks 38 are all annular disks.

The torque flange 22 is mounted to the axle 12. The torque tube 24 is bolted to the torque flange 22 such that the reaction plate 34 is near an axial center of the wheel 10. The end plate 32 is connected to a surface of the reaction plate 34 facing axially away from the axial center of the wheel 10. Thus, the end plate 32 is non-rotatable by virtue of its connection to the torque tube 24. The stator splines 36 support the pressure plate 30 so that the pressure plate 30 is also non-rotatable. The stator splines 36 also support the stator friction disks 40. The stator friction disks 40 engage the stator splines 36 with gaps formed between the stator lugs 44. Similarly, the rotor friction disks 42 engage the rotor splines 18 with gaps formed between the rotor lugs 46. Thus, the rotor friction disks 42 are rotatable by virtue of their engagement with the rotor splines 18 of the wheel 10.

As shown in FIG. 1, the rotor friction disks 42 are arranged with the end plate 32 on one end, the pressure plate 30 on the other end, and the stator friction disks 40 interleaved so that the rotor friction disks 42 are adjacent to non-rotatable friction components. In various embodiments, the number of rotor friction disks 42 and stator friction disks 40 may vary according to the brake assembly design. The pistons 26 are connected to the torque flange 22 at circumferentially spaced positions around the torque flange 22. The pistons 26 face axially toward the wheel 10 and include pucks 54 that contact a side of the pressure plate 30 opposite the rotor friction disks 42. The pistons 26 may be powered electrically, hydraulically or pneumatically.

In various embodiments, prior to operation of the disk brake system 20, pistons 26 are not actuated and gaps exist between each of rotor friction disks 42 and each of the non-rotatable friction components, namely pressure plate 30, end plate 32, and stator friction disks 40. The gaps are formed by the axial spreading out of the rotor disks 42 along the rotor splines 18; and the stator friction disks 40, and the pressure plate 30 along the stator splines 36 due to the movement of the rotor friction disks 42 adjacent to the non-rotatable friction components. During operation of the disk brake system, pistons 26 are actuated, forcing the pressure plate 30 to move along stator splines 36 against the plurality of the friction disks 38, forcing them axially toward the end plate 32 and reaction plate 34. Squeezed between the pressure plate 30 and the reaction plate 34, the gaps are eliminated as friction surfaces contact other friction surfaces.

The friction disks 38 of the disk brake system 20 may be comprised of carbon structures comprising carbon composite ("C/C") material. Contact between friction disks 38 during operation of the disk brake system 20 as described above causes the friction disks 38 to wear over time. In various embodiments, in order to improve the wear rate of the friction disks 38, ceramic materials may be incorporated into the carbon structures during the fabrication process of the carbon composite material comprised in the friction disks 38.

In various embodiments, it may be desirable to incorporate the hard ceramic materials into the carbon structure to improve wear resistance, heat capacity, and/or oxidation resistance of the carbon structure comprised in friction disks 38. Silicon carbide (SiC), for example, may be incorporated into wear products such as friction disks 38, to add strength and hardness to friction disks 38, and therefore, improve wear resistance, heat capacity, and/or oxidation resistance of friction disks 38. In various embodiments, silicon carbide may be incorporated into a pore or the porosity (i.e., multiple pores) of a carbon structure. Such incorporation of silicon carbide may provide additional fibrous reinforcement to the carbon structure.

Figure 2:
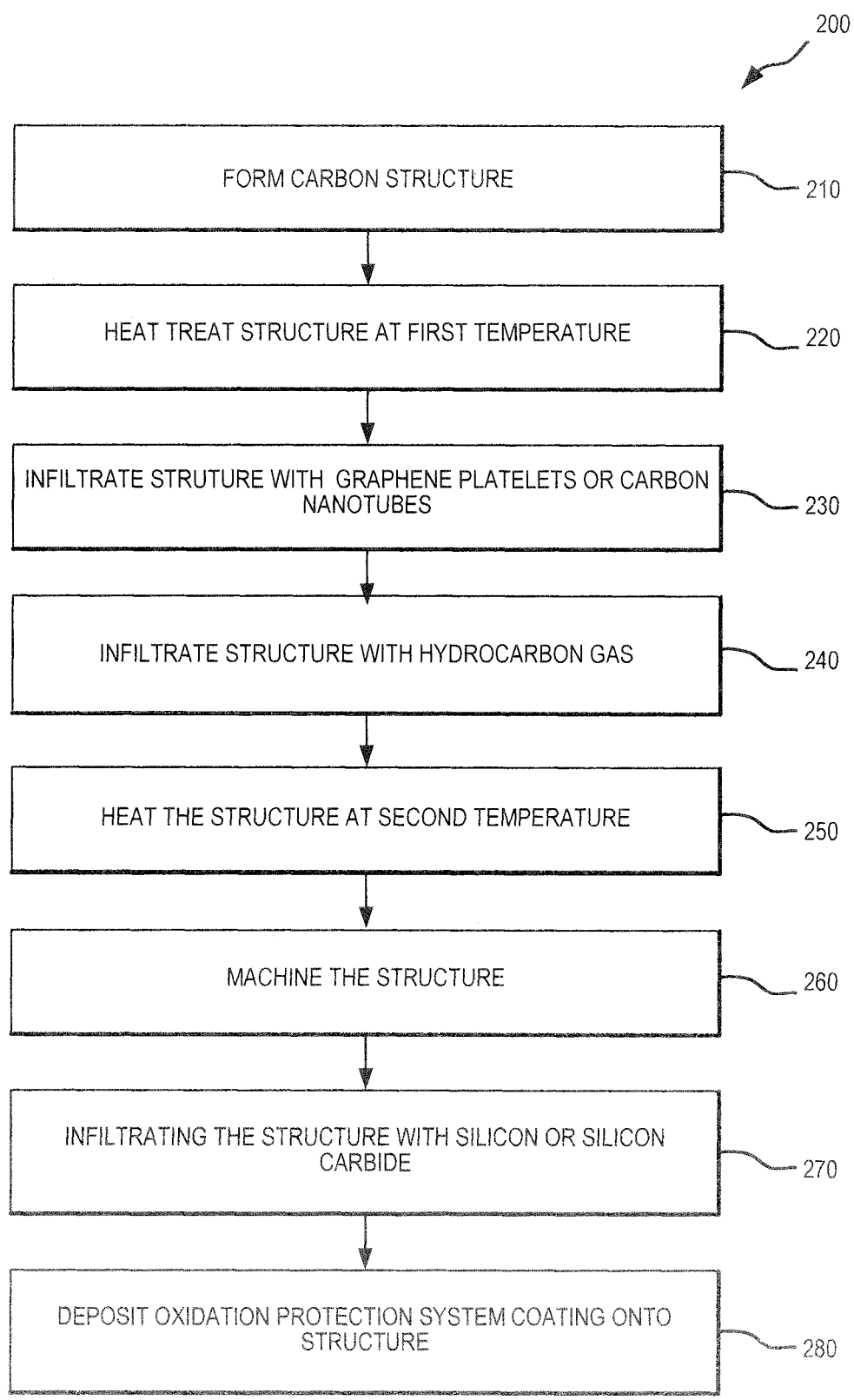
FIG. 2 illustrates a method of treating a carbon structure, in accordance with various embodiments.

With reference to FIG. 2, a process 200 for method of treating a carbon structure is provided, in accordance with various embodiments. A carbon structure may be fabricated, forming a fibrous structure (Step 210). The fibrous structure may comprise a porous structure (i.e., comprising many pores within the carbon structure). A porous structure may comprise any porous structure derived from a fibrous material such as carbon fibers or the like. The carbon fibers may be derived from polyacrylonitrile (PAN), rayon (synthetic fiber derived from cellulose), pitch, or the like. The starting fiber may be pre-oxidized PAN or fully carbonized commercial carbon fiber. The fibrous structure may be prepared using needling of individual textile layers. The individual brake preform may be fabricated using a net shape preforming technology or may be cut from a needled board. Alternatively, preforms may be a 2D lay-up of woven, braided or knitted fabric. The fibrous structure may be in the form of chopped carbon fibers molded and/or needled to form a preform. Prior to the densification process, the fibrous structure may be formed into a preform having any desired shape or form. For example, the fibrous structure may be in the form of a disk having any shape such as, for example, a polygon, a cylinder, a triangle, annular, square, rectangle, pentagon, hexagon, octagon, or the like. In addition, the fibrous structure may have an irregular form.

In various embodiments, the fibrous structure may be heat treated in a process referred to herein as carbonization/graphitization, forming a carbonized fibrous structure (Step 220). The fibrous structure may be carbonized by placing the preforms in a furnace with an inert atmosphere. The inert atmosphere may comprise a noble gas or a less reactive gas, such as nitrogen gas ($N_2$). Carbonization/graphitization may be conducted in a vacuum or partial vacuum (e.g., at pressures of 1-15 torr) (133.3-1999.8 Pa)) or in an inert atmosphere at a first temperature in the range from about 1,400° C. to about 2,800° C. (2,552° F. to about 5,072° F.), and in various embodiments in the range from about 1,400° C. to about 2,500° C. (2,552° F. to about 4,532° F.), and in various embodiments in the range from about 1,400° C. to about 2,200° C. (2,552° F. to about 3,992° F.) (wherein the term about in this context only means +/−100° C.) for a period of time in the range of up to about 60 hours, and in various embodiments, in the range up to about 10 hours (wherein the term about in this context only means +/−2 hours).

In various embodiments, the carbonized fibrous structure may be deposited with at least one of graphene platelets or carbon nanotubes (Step 230). The graphene platelets or carbon nanotubes may be deposited into the carbonized fibrous structure via a dispersion, through a vacuum impregnation process.

In various embodiments, the carbonized fibrous structure may be infiltrated with hydrocarbon gas to form a densified fibrous structure (Step 240). The infiltration may fill voids, or pores, of the carbonized fibrous structure. This may be done using the same furnace used for carbonization or a different furnace. In various embodiments, infiltration with hydrocarbon gas may comprise chemical vapor infiltration or deposition ("CVI/CVD"). CVI/CVD involves heating the furnace and the carbonized preforms, and flowing hydrocarbon gases (e.g., at least one of methane, ethane, propane, butane, and/or the like, as described herein) into the furnace and around and through the fibrous preforms. The hydrocarbons may comprise alkanes, for example, straight chain, branched chain and/or cyclic alkanes, having from 1 to about 8 carbon atoms, and in various embodiments from 1 to about 6 carbon atoms, and in various embodiments from 1 to about 3 carbon atoms. Methane, ethane, propane, cyclopentane, or mixtures of two or more thereof may be used. The gas may comprise one or more alkanes of 2 to about 8 carbon atoms, and in various embodiments from 2 to about 6 carbon atoms. Mixtures of one or more alkanes of 1 to about 8 carbon atoms with one or more alkenes of 2 to about 8 carbon atoms may be used.

In various embodiments, CVI/CVD may be conducted in a vacuum or partial vacuum (e.g., at pressures of 1-15 torr) (133.3-1999.8 Pa)) or in an inert atmosphere at a temperature the range from about 900° C. to about 1100° C. (1,652° F. to about 2,012° F.), and various embodiments in the range of up to about 1,000° C. (1,832° F.) (wherein the term about in this context only means +/−100° C.) for a period of time in the range from about 150 hours to about 650 hours, and in various embodiments, in the range from about 300 hours to about 500 hours (wherein the term about in this context only means +/−24 hours). The inert atmosphere may comprise a noble gas or a less reactive gas, such as nitrogen gas.

In various embodiments, CVI/CVD may be continued until the densified fibrous structure comprises a density in the range from about 1.65 to about 1.80 grams per cubic centimeter (g/cc). In various embodiments, the CVI/CVD may result in a densified fibrous structure comprising about 5% to about 15% open porosity.

In various embodiments, the densified fibrous structure may undergo heat treatment at a second temperature to form a heat treated densified fibrous structure (Step 250). This may be done using the same furnace used for CVI/CVD or a different furnace. If done using the same furnace, the flow of hydrocarbon gases would be stopped following the end of the densification process and the temperature increased. Referring to Step 250, heat treatment may be conducted in a vacuum or partial vacuum (e.g., at pressures of 1-15 torr) (133.3-1999.8 Pa)) or in an inert atmosphere at a temperature in the range from about 1600° C. to about 2400° C. (3,362° F. to about 4,352° F.), and in various embodiments in the range from about 2000° C. to about 2200° C. (3,632° F. to about 3,992° F.) (wherein the term about in this context only means +/−100° C.) for a period of time in the range from about 4 hours to about 14 hours, and in various embodiments, in the range from about 8 hours to about 12 hours (wherein the term about in this context only means +/−2 hours). The inert atmosphere may comprise a noble gas or a less reactive gas, such as nitrogen. In various embodiments, following Step 250 process, the heat treated densified fibrous structure may be machined to near net-shape (i.e., final) (Step 260).

In various embodiments, the heat treated densified fibrous structure may be infiltrated with silicon to form a silicon infiltrated fibrous structure (Step 270). The infiltration with the silicon may be performed using silicon melt infiltration. The silicon may comprise a powder or liquid. In various embodiments, the incorporation of a controlled starting amount of fine elemental silicon particles around and throughout the heat treated densified fibrous structure may lead, after various steps, to the formation of silicon carbide within and throughout of the heat treated densified fibrous structure. In various embodiments, the silicon powder may be applied to the heat treated densified fibrous structure, and the heat treated densified fibrous structure and silicon may be exposed to heat. During heat treatments of the heat treated densified fibrous structure under an inert atmosphere at temperatures ranging from 1400° C. (2552° F.) to 1600° C. (2912° F.), carbo-thermal reduction of silicon and/or carbon compounds may occur, yielding silicon carbide compounds within and throughout the voids throughout the fibrous network of the heat treated densified fibrous structure. The heat treatments may be conducted in a vacuum or partial vacuum (e.g., at pressures of 1-20 torr) (133.3-2666.5 Pa)). Stated another way, molten silicon infiltrates the porosity of the heat treated densified fibrous structure and increases the density of the heat treated densified fibrous structure. The inert atmosphere may comprise a noble gas or a less reactive gas, such as nitrogen gas.

The silicon may be introduced to the heat treated densified fibrous structure in any suitable manner. For example, in various embodiments, silicon powder may be mixed in a carrier liquid to form a slurry. The heat treated densified fibrous structure may be soaked in the slurry and heat treated to initiate the carbo-thermal reduction of silicon and/or carbon compounds to silicon carbide compounds within and throughout the heat treated densified fibrous structure. In various embodiments, silicon may first be melted and then poured onto the heat treated densified fibrous structure, either under a vacuum or not, in order to initiate the carbo-thermal reduction of silicon and/or carbon compounds to silicon carbide compounds within and throughout the voids of the heat treated densified fibrous structure. The silicon carbide infiltrated fibrous structure may comprise about 1% to about 15% silicon carbide (SiC) ceramic matrix composite (CMC), about 2% to about 10% SiC CMC, about 3% to about 9% SiC CMC, or about 4% to about 8% SiC CMC by weight. In various embodiments, the silicon carbide infiltrated fibrous structure may comprise a bulk density of about 2.0 g/cc to about 2.5 g/cc. In various embodiments, the silicon carbide infiltrated fibrous structure may comprise less than about 3% open porosity, where open porosity is the percentage of open pores across 100% of the volume of the silicon carbide infiltrated fibrous structure. In various embodiments, SiC may form on the outer periphery of the final composite. In various embodiments, the silicon carbide infiltrated fibrous structure may comprise unreacted silicon within and throughout the voids of the silicon carbide infiltrated fibrous structure. In various embodiments, the silicon carbide infiltrated fibrous structure may comprise less than 2% silicon by weight.

In various embodiments, the infiltration with silicon may comprise at least one of pre-ceramic polymer infiltration or polymer infiltration and pyrolysis. Pre-ceramic polymer infiltration may comprise a pre-ceramic polymer being applied to the heat treated densified fibrous structure. A pre-ceramic polymer may be polymer that can be pyrolyzed to form a ceramic material, for example, a polycarbosilane resin, such as that provided by Starfire® Systems SMP-10. The heat treated densified fibrous structure may be subjected to one or more polymer infiltration and pyrolysis (PIP) cycles, which may comprise being infiltrated by the pre-ceramic polymer and then pyrolyzed at temperatures ranging from 800° C. (1472° F.) to 1800° C. (3272° C.) to form a ceramic material, such as silicon carbide from a pre-ceramic polymer of polycarbosilane resin.

In various embodiments, the heat treated densified fibrous structure may be infiltrated with silicon carbide using chemical vapor infiltration or deposition (CVI/CVD). In various embodiments, infiltration with silicon carbide using CVI/CVD may be conducted in a vacuum or partial vacuum (e.g., at pressures of 1-15 torr) (133.3-1999.8 Pa)) or in an inert atmosphere at a temperature in the range from about 900° C. to about 1100° C. (1,652° F. to about 2,012° F.), and in various embodiments in the range of up to about 1,000° C. (1,832° F.) (wherein the term about in this context only means +/−100° C.) for a period of time in the range from about 150 hours to about 650 hours, and in various embodiments, in the range from about 300 hours to about 500 hours (wherein the term about in this context only means +/−24 hours). The inert atmosphere may comprise a noble gas or a less reactive gas, such as nitrogen gas.

In various embodiments, the silicon carbide infiltrated fibrous structure may be covered with an oxidation protection system coating, configured to increase the silicon carbide infiltrated fibrous structure's resistance to oxidation and corrosion (Step 280).

Figure 3A:
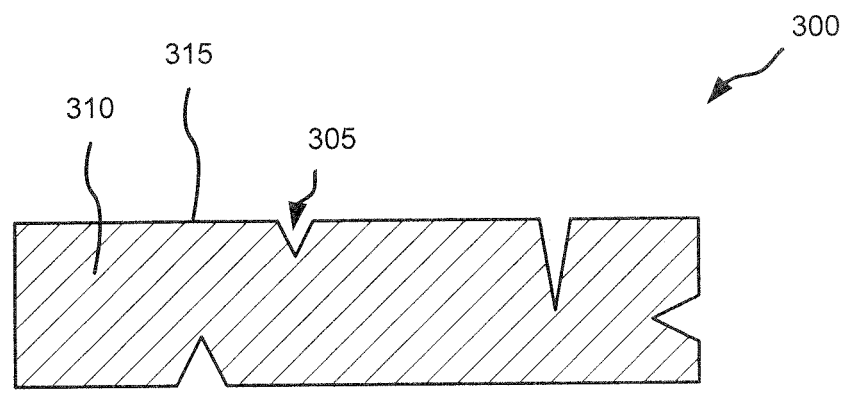
FIG. 3A illustrates a side view of a carbon/carbon part comprising pores, in accordance with various embodiments.

With reference to FIG. 3A, carbon/carbon silicon carbide composite structure 300 is provided. Carbon/carbon silicon carbide composite structure 300 may comprise carbon fibers 310 that are heat treated at a first temperature (Step 220), infiltrated with hydrocarbon gas using chemical vapor infiltration or deposition (CVI/CVD) (Step 240), and heated treated at a second temperature (Step 260). Carbon/carbon silicon carbide composite structure 300 may comprise an exterior surface 315 comprising voids 305. Voids 305 may be pores.

Figure 3B:
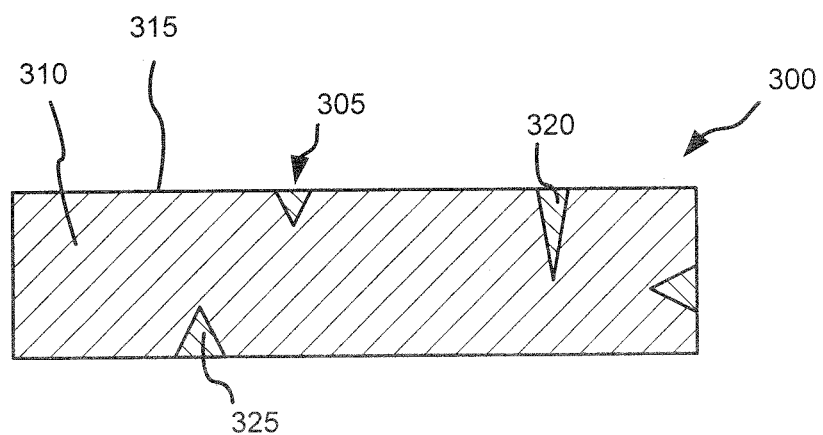
FIG. 3B illustrates a side view of a carbon/carbon part, in accordance with various embodiments.

In various embodiments, and with reference to FIG. 3B, carbon/carbon silicon carbide composite structure 300 may comprise pyrolytic carbon 320 deposited on carbon fibers 310. In various embodiments, carbon/carbon silicon carbide composite structure 300 may be infiltrated with at least one of silicon or silicon carbide (Step 270). In various embodiments, the infiltrating with silicon may be performed at a third temperature ranging from about 1400° C. (2552° F.) to about 1600° C. (2912° F.) In various embodiments, voids 305 of exterior surface 315 may comprise silicon carbide 325 bonded to carbon fibers 310. In various embodiments, voids 305 of exterior surface 315 may comprise silicon (not shown) bonded to carbon fibers 310. In various embodiments, carbon/carbon silicon carbide composite structure 300 may comprise a bulk density of between about 2.0 and about 2.5 g/cc. In various embodiments, carbon/carbon silicon carbide composite structure 300 may comprise a bulk density of about 2.1 g/cc. In various embodiments, carbon/carbon silicon carbide composite structure 300 may comprise from about 1% to about 15% silicon carbide (SiC) ceramic matrix composite (CMC), about 2% to about 10% SiC CMC, about 3% to about 9% SiC CMC, or about 4% to about 8% SiC CMC by weight. In various embodiments, carbon/carbon silicon carbide composite structure 300 may comprise less than about 3% open porosity, where open porosity is the percentage of open pores across 100% of the volume of the silicon carbide infiltrated fibrous structure. In various embodiments, carbon/carbon silicon carbide composite structure 300 may comprise less than 1% silicon by weight. In various embodiments, and with reference to FIG. 1, carbon/carbon silicon carbide composite structure 300 may comprise a part in disk brake system 20, including at least one of friction disks 38, stator friction disk 40, rotor friction disk 42, rotor core, or stator core.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of treating a carbon/carbon composite, comprising:
   depositing at least one of graphene platelets or carbon nanotubes into a carbonized fibrous structure via a dispersion, through a vacuum impregnation process;
   infiltrating the carbonized fibrous structure with hydrocarbon gas to form a densified fibrous structure having a density in a range from about 1.65 grams per cubic centimeter to about 1.80 grams per cubic centimeter, wherein the depositing is executed prior to execution of the infiltrating the carbonized fibrous structure with hydrocarbon gas;
   treating the densified fibrous structure with heat at a first temperature range from about 1600 to about 2400° C. to form a heat treated densified fibrous structure; and
   infiltrating the heat treated densified fibrous structure with silicon to form a silicon carbide infiltrated fibrous structure.

2. The method of claim 1, further comprising machining the heat treated densified fibrous structure to near net-shape.

3. The method of claim 1, further comprising applying an oxidation protection system coating to the silicon carbide infiltrated fibrous structure.

4. The method of claim 1, wherein the infiltrating the heat treated densified fibrous structure with the silicon occurs by at least one of pre-ceramic polymer infiltration or silicon melt infiltration.

5. The method of claim 1, wherein the infiltrating the heat treated densified fibrous structure with the silicon is performed at a second temperature ranging from about 1400 to about 1600° C.

6. The method of claim 1, wherein the silicon carbide infiltrated fibrous structure has a bulk density of between about 2.0 and about 2.5 g/cc.

7. The method of claim 1, wherein the silicon carbide infiltrated fibrous structure comprises from about 2% to about 10% silicon carbide ceramic matrix composite by weight, wherein the silicon carbide infiltrated fibrous structure comprises less than about 3% open porosity.

8. A method of treating a carbon structure, comprising:
   treating a fibrous structure with heat at a first temperature ranging from about 1400 to about 2800° C. to form a carbonized fibrous structure;
   depositing at least one of graphene platelets or carbon nanotubes into the carbonized fibrous structure via a dispersion, through a vacuum impregnation process;
   infiltrating the carbonized fibrous structure with hydrocarbon gas to form a densified fibrous structure, wherein the infiltrating using the hydrocarbon gas is executed after the depositing;
   treating the densified fibrous structure with heat at a second temperature range from about 1600 to about 2400° C. to form a heat treated densified fibrous structure; and
   infiltrating the heat treated densified fibrous structure with silicon to form a silicon carbide infiltrated fibrous structure.

9. The method of claim 8, further comprising, machining the heat treated densified fibrous structure to near net-shape.

10. The method of claim 8, further comprising, applying an oxidation protection system coating to the silicon carbide infiltrated fibrous structure.

11. The method of claim 8, wherein the treating with heat at the first temperature and the second temperature are performed under the vacuum.

12. The method of claim 8, wherein the infiltrating the heat treated densified fibrous structure with the silicon occurs by at least one of pre-ceramic polymer infiltration or silicon melt infiltration.

13. The method of claim 8, wherein the infiltrating the heat treated densified fibrous structure with the silicon is performed at a third temperature ranging from about 1400° C. to about 1600° C.

14. The method of claim 8, wherein the silicon carbide infiltrated fibrous structure has a bulk density of about 2.0 to about 2.5 g/cc.

15. The method of claim 8, wherein the silicon carbide infiltrated fibrous structure comprises about 2% to about 10% silicon carbide ceramic matrix composite by weight, wherein the silicon carbide infiltrated fibrous structure comprises less than about 3% open porosity.

\* \* \* \* \*